(12) United States Patent
Xiang (10) Patent No.: US 12,105,577 B2
(45) Date of Patent: Oct. 1, 2024

(54) MULTI-CORE CHIP, SYSTEM AND METHOD BASED THEREON, AND STORAGE MEDIUM

(71) Applicant: XI'AN ZHONGXING NEW SOFTWARE CO., LTD., Xi'an (CN)

(72) Inventor: Haitao Xiang, Xi'an (CN)

(73) Assignee: XI'AN ZHONGXING NEW SOFTWARE CO., LTD., Xi'an (CN)

( * ) Notice: Subject to any disclaimer, the term of this patent is extended or adjusted under 35 U.S.C. 154(b) by 749 days.

(21) Appl. No.: 17/290,601

(22) PCT Filed: Oct. 23, 2019

(86) PCT No.: PCT/CN2019/112684
§ 371 (c)(1),
(2) Date: Apr. 30, 2021

(87) PCT Pub. No.: WO2020/093868
PCT Pub. Date: May 14, 2020

(65) Prior Publication Data
US 2022/0004246 A1 Jan. 6, 2022

(30) Foreign Application Priority Data
Nov. 6, 2018 (CN) .......................... 201811314925.8

(51) Int. Cl.
*G06F 1/3293* (2019.01)
*G06F 9/48* (2006.01)
(Continued)

(52) U.S. Cl.
CPC .......... *G06F 1/3293* (2013.01); *G06F 9/4893* (2013.01); *G06F 9/5016* (2013.01); *G06F 12/0811* (2013.01)

(58) Field of Classification Search
CPC .... G06F 1/3293; G06F 9/4893; G06F 9/5016; G06F 12/0811; G06F 1/3296; G06F 1/26; G06F 9/4405; Y02D 10/00
See application file for complete search history.

(56) References Cited

U.S. PATENT DOCUMENTS

2002/0078338 A1 6/2002 Lay et al.
2011/0276321 A1* 11/2011 Tuan ..................... G06F 30/343
                                                   703/19
2017/0111867 A1* 4/2017 Jeansonne ............... H04L 67/01

FOREIGN PATENT DOCUMENTS

CN          1540503 A      10/2004
CN        102207881 A   *  10/2011
(Continued)

OTHER PUBLICATIONS

International Search Report and Written Opinion for the International Patent Application No. CT /CN2019/112684 dated Jan. 14, 2020.
(Continued)

*Primary Examiner* — Zhipeng Wang
(74) *Attorney, Agent, or Firm* — Vivacqua Crane, PLLC (57) ABSTRACT

A multi-core chip, system and method based thereon, and a storage medium are disclosed. The multi-core chip may include a first physical core configured to, and in response to receiving a system shutdown instruction, extract a minimum resource set, save the minimum resource set in a first built-in memory, and notify the main CPU to shut down the system; and in response to receiving a system startup instruction, copy the minimum resource set in the first built-in memory to the main memory, and transfer a system control privilege to the main CPU; the first built-in memory, configured to save the minimum resource set; and a power management chip, configured to provide an operating voltage for the system in a system startup state and provide the
(Continued)

second voltage for the first physical core in the system shutdown state.

20 Claims, 10 Drawing Sheets

(51) Int. Cl.
*G06F 9/50* (2006.01)
*G06F 12/0811* (2016.01)

(56) References Cited

FOREIGN PATENT DOCUMENTS

| CN | 103150288 A | * | 6/2013 |
| CN | 109614153 A | | 4/2019 |

OTHER PUBLICATIONS

CN, Extended Search report and Office Action dated Apr. 2, 2020, CN Application No. 201811314925.8.

* cited by examiner

S401 Input user instruction

C401 Startup instruction?

S402 Supply power to CPU and peripheral circuits such as RAM, ROM

S403 Regulate the voltage of the physical core CORE X to a normal operating voltage C402 Shutdown instruction?

S404 Cut off the power supply of CPU main circuit and peripheral circuits such as RAM and ROM S405 Regulate the voltage of the physical core CORE X to 1.8v in a low power operating state S406 Perform exception handling S407 End

MULTI-CORE CHIP, SYSTEM AND METHOD BASED THEREON, AND STORAGE MEDIUM

CROSS-REFERENCE TO RELATED APPLICATION

This application is a national stage filing under 35 U.S.C. § 371 of international application number PCT/CN2019/112684, filed Oct. 23, 2019, which claims the benefit of priority from Chinese Patent Application No. 201811314925.8, filed on 6 Nov. 2018. The contents of these applications are incorporated herein by reference in their entirety.

TECHNICAL FIELD

The disclosure relates to the field of communication, in particular to a multi-core chip, a system and a method based thereon, and a storage medium.

BACKGROUND

With the development of intelligent hardware and artificial intelligence, electronic products have more and more complex functions, and increasing system capacities. In particular, intelligent hardware generally has an operating system, and the startup time becomes longer as the number of peripheral devices increases. Therefore, on the one hand, user experience becomes worse. On the other hand, the power consumption level is increased since the users may be unwilling to shut down, which is not conducive to the battery life of intelligent devices.

At present, there are two ways to optimize the startup of intelligent terminals.

The first way is to use a shutdown and standby mode in which a real shutdown is not executed during the execution of user shutdown instruction, and the terminal is not shut down essentially, so as to improve the startup speed for the next time.

The second way is to perform software tailoring to reduce the kernel size and loading time of the operating system, so as to improve the startup speed.

However, in the first way, due to the high standby power consumption, the lifetime and endurance of the battery will be reduced, and the service life of products will be shortened if the hardware is continuously powered for a long time. In the second way, it is difficult to apply to multiple fields because of poor universality. In particular, since the system is becoming larger and larger, it is difficult to meet the diversified development of the industry due to improper tailoring.

SUMMARY

According to embodiments of the present disclosure, a multi-core chip and a system are provided to at least address the problem of slow system startup speed in the related art.

According to an embodiment of the present disclosure, a multi-core chip is provided, including a main CPU and a main memory. The multi-core chip further includes a first physical core configured to be responsible for shutting down and starting up a system, a first built-in memory, and a power management chip. In response to receiving a system shutdown instruction, the first physical core is configured to extract a minimum resource set which is for starting up the system, save the minimum resource set in the first built-in memory, and notify the main CPU to shut down the system. And in response to receiving a system startup instruction, copy the minimum resource set in the first built-in memory to the main memory, and transfer a system control privilege to the main CPU. The first physical core is operable at a first voltage which is a normal operating voltage of the first physical core and a second voltage which is a holding voltage of the first physical core in a system shutdown state, and the first voltage is greater than the second voltage. The first built-in memory is configured to save the minimum resource set. The power management chip is configured to convert voltages to realize output of multi-level voltages, to provide an operating voltage for the system in a system startup state and to provide the second voltage for the first physical core in the system shutdown state.

According to another embodiment of the present disclosure, an electronic system is provided, including a peripheral device and the multi-core chip as described in the above embodiment.

According to still another embodiment of the present disclosure, a method for power management based on the system as described in the above embodiment is further provided, including: providing, by the power management chip, a normal operating voltage for each component of the system and regulating a voltage of the first physical core from the second voltage to the first voltage in response to receiving a system startup instruction; and cutting off, by the power management chip, the voltage of each component of the system, continuing to supply power to the first physical core, and regulating the voltage of the first physical core from the first voltage to the second voltage in response to receiving a system shutdown instruction.

According to still another embodiment of the present disclosure, a shutdown method based on the system as described in the above embodiment is further provided, including: receiving, by the first physical core, a system shutdown instruction; extracting, by the first physical core, a minimum resource set which is configured for starting up the system and a current user process address and path, and copying the minimum resource set and the current user process address and path to the first built-in memory; and notifying, by the first physical core, the main CPU to force a process shutdown, and notifying the power management chip to cut off a power supply of the system.

According to still another embodiment of the present disclosure, a startup method based on the system as described in the above embodiment is further provided, including: receiving, by the first physical core, a system startup instruction; copying, by the first physical core, the minimum resource set saved in the first built-in memory to the main memory; and transferring, by the first physical core, the system control privilege to the main CPU.

According to still another embodiment of the present disclosure, a system recovery method based on the system as described in the above embodiment is further provided, including: receiving, by the first physical core, an instruction to recover to a state before last shutdown; copying, by the first physical core, the startup instruction saved in the first built-in memory to the main memory to start the system; and copying, by the first physical core, a memory image before shutdown saved in the first built-in memory to the main memory, and transferring the system control privilege to the main CPU.

According to still another embodiment of the present disclosure, a method for recovery from system crash based on the system as described in the above embodiment is further provided, including: detecting whether the first timer and the second timer time out; resetting the main CPU and other physical cores except the first physical core in response to that the first timer times out while the second timer does not time out; and resetting the first physical core in response to that the second timer times out.

According to still another embodiment of the present disclosure, a method for peripheral device management based on the system as described in the above embodiment is further provided, including: judging whether the system is in a normal operating state or a low power shutdown state; in response to the system being in the normal operating state, detecting whether there is an abnormal startup and/or an abnormal temperature in the peripheral device; in response to detection of the abnormal startup and/or the abnormal temperature in the peripheral device, starting a repair program and/or starting a temperature protection program, by the reliability function module, to perform repair and/or temperature protection for the peripheral device.

According to still another embodiment of the present disclosure, a storage medium is further provided, the storage medium stores a computer program which, when executed, performs the method as described in any of the above embodiments.

BRIEF DESCRIPTION OF DRAWINGS

The drawings are provided for a further understanding of the technical themes of the present disclosure, and constitute a part of the description. The exemplary embodiments and the description of the present application are used to explain the technical themes of the present disclosure, and do not constitute an improper limitation of the present disclosure. In the drawings.

DETAILED DESCRIPTION

The present disclosure will be described in detail hereinafter with reference to the drawings and embodiments. It should be noted that, in the present application, the embodiments and features of the embodiments may be combined with each other without conflict.

It should be noted that the terms "first," "second," and the like in the description, the claims and the drawings of the present disclosure are used for distinguishing between similar elements and not necessarily for describing a particular sequential or chronological order.

According to an embodiment of the preset disclosure, a multi-core chip, a system with the multi-core chip, and a method for power management, a quick startup method, a system recovery method and the like based on the system are provided.

Figure 1:
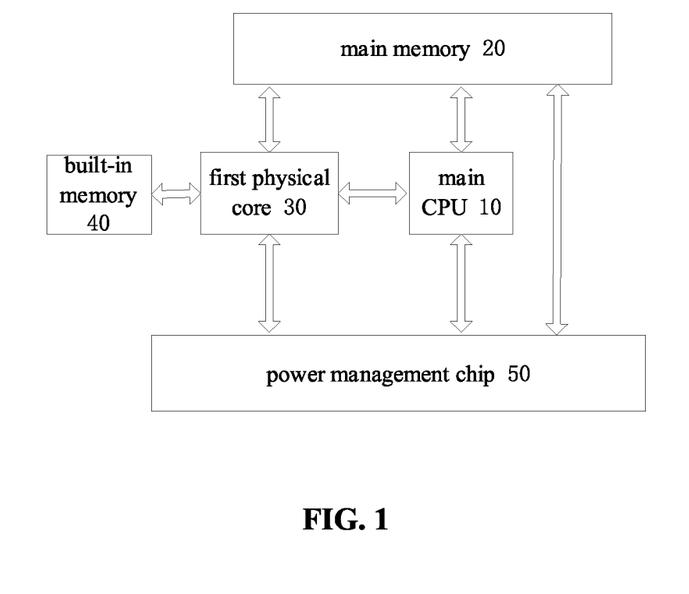
FIG. 1 is a schematic structural diagram of a multi-core chip according to an embodiment of the present disclosure.

According to an embodiment of the preset disclosure, a multi-core chip is provided, which may be implemented based on an existing multi-core chip, that is, corresponding functional components are added on the basis of the existing multi-core chip. FIG. 1 is a schematic structural diagram of the multi-core chip according to this embodiment. As shown in FIG. 1, the multi-core chip of this embodiment may include a main CPU 10 and a main memory which the existing multi-core chip includes (the existing multi-core chip also includes other components, which are not shown in the figure). The multi-core chip further includes a first physical core 30, a first built-in memory 40 and a power management chip 50.

The first physical core 30 is configured to be responsible for shutting down and starting up a system. In response to receiving a system shutdown instruction, the first physical core 30 is configured to extract a minimum resource set which is configured for starting up the system, save the minimum resource set in the first built-in memory 40, and notify the main CPU 10 to shut down the system. And in response to receiving a system startup instruction, the first physical core 30 is further configured to copy the minimum resource set in the first built-in memory 40 to the main memory 20, and transfer a system control privilege to the main CPU 10. The first physical core 30 is operable at a first voltage which is a normal operating voltage of the first physical core 30 and a second voltage which is a holding voltage of the first physical core 30 in a system shutdown state, and the first voltage is greater than the second voltage.

The first built-in memory 40 is configured to save the minimum resource set.

The power management chip 50 is configured to convert voltages to realize output of multi-level voltages, to provide an operating voltage for the system in a system startup state, and to provide the second voltage for the first physical core 30 in the system shutdown state.

In the above embodiments, the first physical core 30 may reuse any of the physical cores in the current multi-core chip architecture, which can simplify the existing chip design. Of course, the first physical core may also be implemented by adding a dedicated physical core to the current chip architecture.

In the above embodiments, the first built-in memory 40 may adopt a built-in RAM with small capacity and low power consumption, so as to increase the reading and writing efficiency of the memory.

In the above embodiments, the multi-core chip may also have a built-in reliability function module, which has built-in general reliability programs, including device repair programs, peripheral device temperature protection programs, and low-power peripheral device self-test programs. The module can realize product peripheral device management and multi-core chip crash self-rescue.

Figure 2:
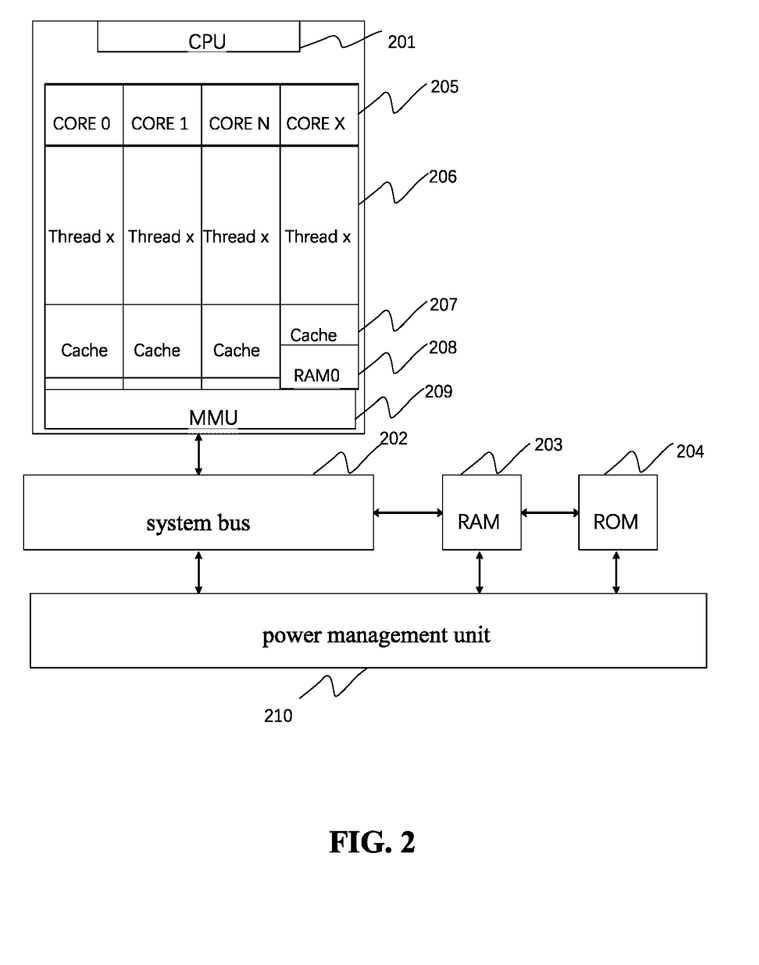
FIG. 2 is a schematic structural diagram of a system with the multi-core chip according to an embodiment of the present disclosure.

According to an embodiment of the present disclosure, a system with the above-mentioned multi-core chip is provided. As shown in FIG. 2, the multi-core chip of this embodiment includes a plurality of physical cores 205, multi-threads 206, multi-level caches 207, a high-speed built-in memory 208 and a memory management unit 209.

In this embodiment, the system also has a peripheral circuit, which includes a system bus 202, an internal memory RAM (random access memory) 203, and an external memory ROM (read-only memory) 204. In addition, the whole system also includes a power management module 210. The multi-core chip interacts with the RAM 203 and the ROM 204 through the system bus 102.

In this embodiment, a physical core CORE X refers to a low-power physical core specially introduced for the multi-core chip, which can be implemented by reusing a core of the existing multi-core chip, or designing a new physical core in the existing design. In this embodiment, a separate design is taken as an example.

Typical features of this physical core CORE X include the ability to operate at a constant voltage, such as 3.6V, or at a low voltage, for example 1.8V in this embodiment. The physical core is configured with a cache or memory RAM0 which may work at a low voltage. RAM0 may be used to store a system startup instruction set, and may also be used to store an address pointer of current running process.

At present, the reading and writing efficiency of RAM is much higher than the reading and writing efficiency of mainstream FLASH chips, for example, the parameters of a mainstream FLASH chip includes a reading speed of about 200 MB/s and a writing speed of about 20 MB/s, while the reading and writing efficiency parameters of LPDDR4 RAM for a mainstream mobile terminal includes a reading speed of about 25 GB/s and a writing speed of about 10 GB/s. It can be seen that the reading efficiency of RAM is about 100 times that of ROM, and the writing efficiency is about 50 times that of ROM. Therefore, RAM0 can greatly shorten the boot loading time in theory. Assuming that the traditional boot program loading takes 20 seconds, while it only takes 200 ms to complete the loading by using RAM0, the efficiency is improved by about 20 s.

The functions of each module of the multi-core chip are described as follows.

The multi-core chip 201 includes a plurality of physical cores, CORE 0 to CORE X.

The system bus 202, which is a bus connecting chips and peripheral devices, is responsible for the communication between chips and internal components.

The main memory 203, namely RAM 203, generally refers to memory for intelligent devices.

The ROM 204, namely external memory, generally refers to FLASH for intelligent devices, and is used to save various installation or executable files.

The CORE X 205, namely physical core CORE X, is a low-power physical core, and is mainly responsible for system reliability algorithm maintenance and performance optimization.

The multi-thread 206, namely Thread X, is responsible for the parallel execution of instructions to improve the execution efficiency of the physical core.

The cache 207, in some embodiments, multi-level caches may be preset inside the chip, and each physical core may be configured with a different cache capacity and different numbers of caches.

The memory 208, namely RAM0, refers to a small-capacity memory or a cache specially configured for the physical core CORE X.

The memory management unit 209, namely MMU, is responsible for mapping and addressing each physical memory in the system.

The power management chip 210 can convert voltages to realize output of multi-level voltages, so as to provide operating voltages for the above-mentioned functional components of the system, and continue to provide a relatively low maintenance voltage for the CORE X 205 in a system shutdown state.

Figure 3:
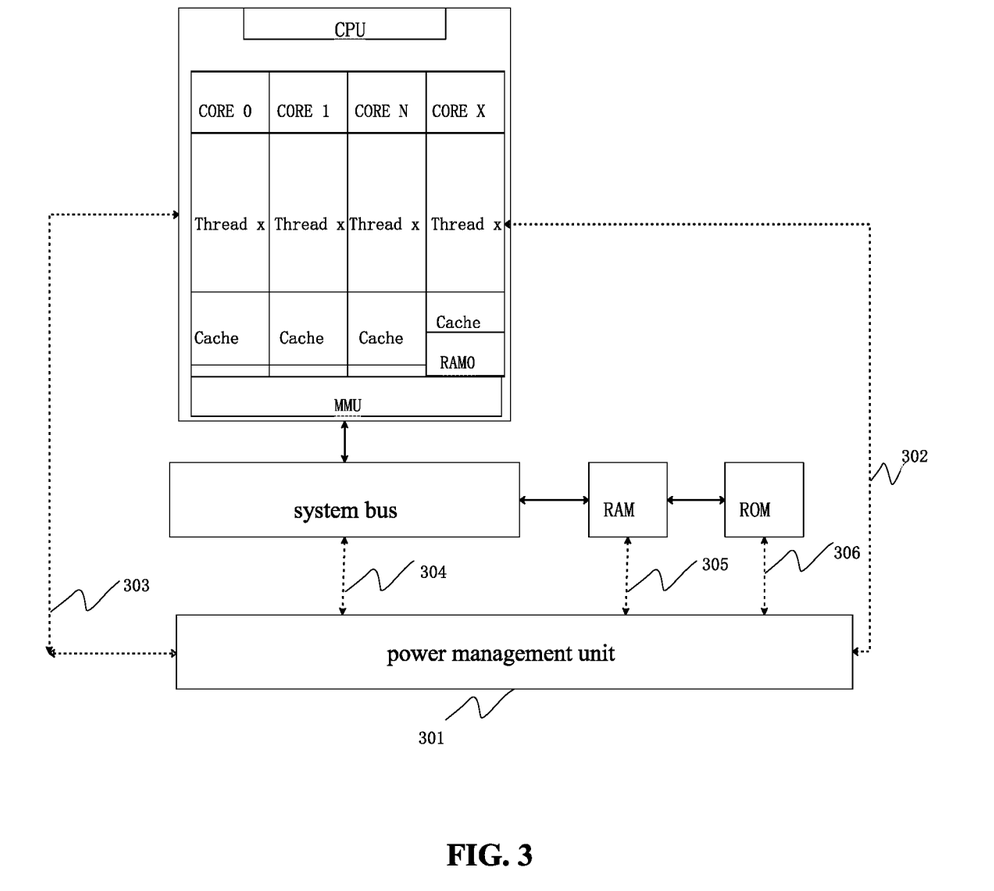
FIG. 3 is a schematic diagram of a power management architecture according to an embodiment of the present disclosure.

Based on the multi-core chip, a power management system is further provided. In this embodiment, the power management chip in the multi-core chip can provide multi-level voltage output and control. In order to keep the power consumption of the physical core low in the shutdown state to save power, a minimum voltage supply may be maintained for the physical core during shutdown, thereby reducing power consumption. As shown in FIG. 3, the functions of each module in this embodiment are described as follows.

A power management chip 301 can provide various voltage outputs and conversions, and can be programmed to realize output of multi-level voltages.

A physical core CORE X input circuit 302 can continue to maintain input in a shutdown state, and still maintain a variable voltage supply in a power-off state of other cores of the whole CPU, so as to meet normal operation of physical core CORE X of the CPU.

A CPU main input circuit 303 provides normal current and voltage input for the CPU to ensure the normal operation of the CPU in a startup state.

A bus input circuit 304 provides current and voltage input for the bus to ensure the normal communication of the system bus.

A RAM input circuit 305 provides current and voltage input for the main memory of the system to ensure the normal power-on of the memory.

A ROM input circuit 306 provides current and voltage input for the external memory of the system to ensure the normal power-on of the external memory and the normal reading and writing of other application processes.

Figure 4:
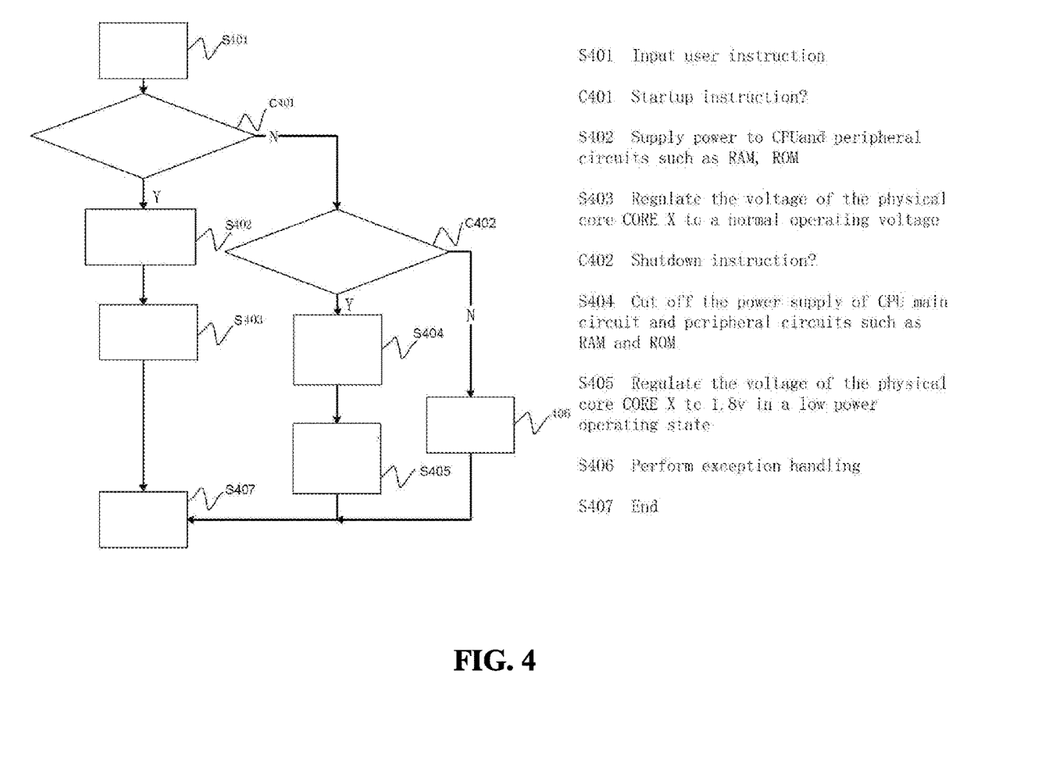
FIG. 4 is a flowchart of a method for power management according to an embodiment of the present disclosure.

Based on the multi-core chip in the previous embodiments, a method for power management is further provided. As shown in FIG. 4, the method for power management includes the following process.

In a step of S401, a user instruction is input.

An intelligent device generally provides peripheral keys or operating UI for user instruction input such as providing a startup key, or defining different events by pressing different keys, and may provide a variety of key combinations to meet different instruction input, for example, key 1 for quick startup, and key 1+key 3 for returning to the state before last shutdown.

In a step of judgment C401, whether the user input is a startup instruction is judged.

After the key instruction is input, the power management chip can determine whether the current input is a startup or shutdown instruction or other instructions, and if the current input is a startup instruction, step S402 is executed; if not, judgment C402 is executed.

In a step of S402, power is supplied to CPU or peripheral RAM and circuits.

If the current input is a startup instruction, the power management chip starts to provide power input for peripheral CPU, RAM, ROM, etc., so as to ensure normal operating voltages of physical components of the intelligent device.

In a step of S403, the voltage of the physical core CORE X is regulated to a normal operating voltage.

At the same time, the power management chip switches the voltage switch to ensure that the physical core CORE X operates normally at the normal voltage.

In a step of judgment C402, whether the user input is a shutdown instruction is judged.

If the user input is a shutdown instruction, step S404 is executed; if not, step 406 is executed to perform exception handling, and exception handling may be performed by ignoring and not handling the key instruction.

In a step of S404, the power supply of CPU main circuit and the power supply of peripheral circuits such as RAM and ROM are cut off.

During shutdown, the power management chip cuts off the main power input of CPU and the power input of peripheral circuits such as RAM, ROM and bus, so as to ensure that the physical core CORE X operates with low power consumption in the shutdown state and only the physical core CORE X operates.

In a step of S405, the voltage of the physical core CORE X is regulated to 1.8 v in a low voltage operating state.

The power management chip switches the voltage of the physical core to 1.8 v in a low power operating state.

In a step of S406, exception handling is performed.

If the user presses the power on-off key, but the time for which the key keeps pressed is not satisfied or other conditions are not satisfied, the power management chip cannot determine that it is a power-on or a power-off instruction, and the key instruction is ignored and no handling is performed.

In a step of S407, the process ends.

Figure 5:
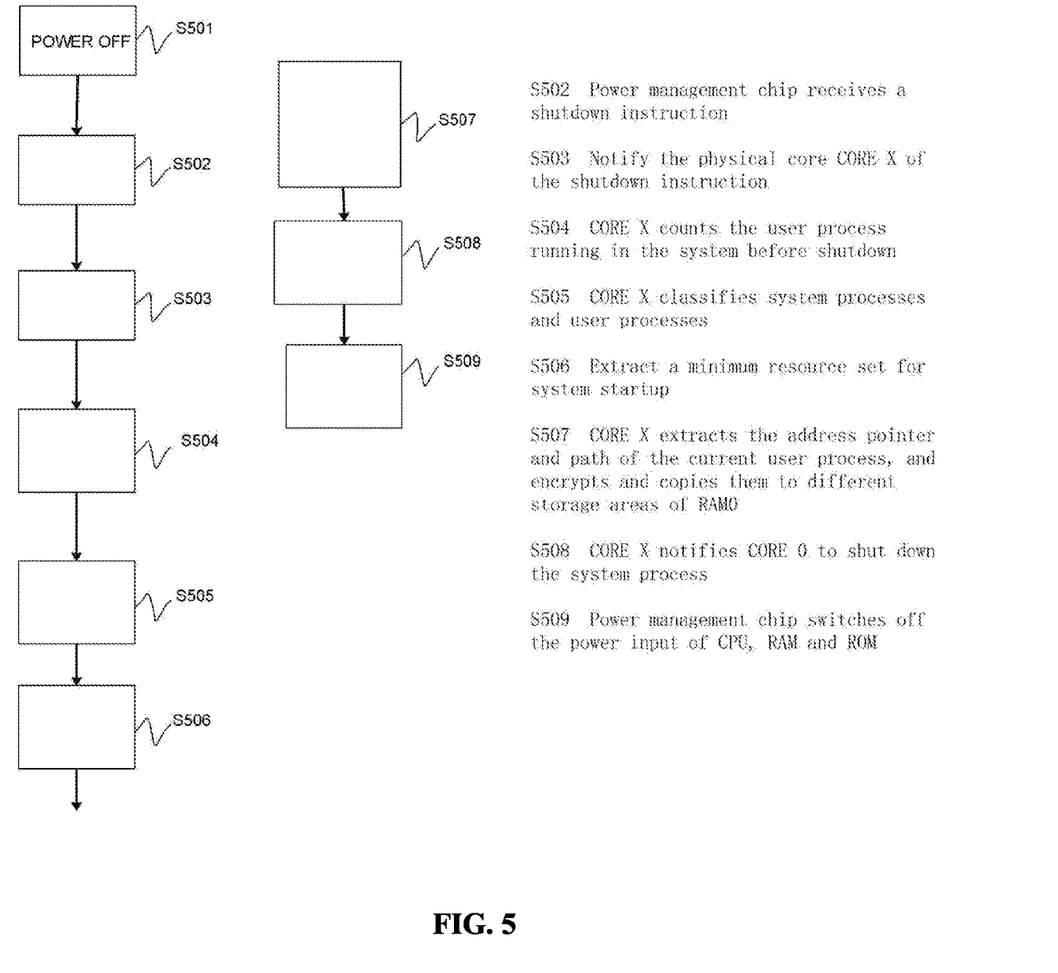
FIG. 5 is a flowchart of a shutdown method according to an embodiment of the present disclosure.

According to an embodiment of the present disclosure, a multi-core chip shutdown method is further provided, as shown in FIG. 5, the shutdown method includes the following process.

In a step of S501, power off is performed.

The system detects that the user input is a shutdown instruction.

In a step of S502, the power management chip receives the shutdown instruction.

The power management chip detects the shutdown instruction.

In a step of S503, the physical core CORE X is notified of the shutdown instruction.

The power management chip notifies the current CPU physical core CORE X of the shutdown instruction, where the physical core CORE X is responsible for starting up and shutting down the system.

In a step of S504, the physical core CORE X counts the current user process information of the system.

The physical core CORE X obtains the user process information of the current system from CPU 0, including process ID, process entry address, process name and process path, etc., and distinguishes the current process as a system process or a user process. For the current system running process, the current running process may need to be identified, which may be used to recover to the last state when the system is started.

In a step of S505, the CORE X classifies system processes and user processes.

The physical core CORE X classifies system processes and user processes, and the priority of user processes is lower than that of system processes. In a simple way, whether it is a system process may be judged by means of a system self-starting list, and non-self-starting processes may be regarded as user processes.

In a step of S506, a minimum resource set which is configured for starting up a systemic extracted.

The physical core CORE X extracts the minimum resource set, and excludes peripheral and communication processes from the system process. For intelligent devices, peripheral processes are generally considered as unnecessary processes, processes associated with the communication chip are considered as unnecessary processes, and kernel threads are considered as the first priority processes.

In a step of S507, the physical core CORE X extracts, compresses and encrypts the addresses and paths of the current user processes, which are then copied to different process image areas of RAM0.

The physical core CORE X extracts, compresses and encrypts the addresses and paths of the user processes, which are then saved in a user process image area of RAM0. The system processes are copied to a system image area.

In a step of S508, the physical core CORE X notifies CORE 0 to forcibly shut down the processes.

The physical core CORE X completes the information recording before shutdown, and notifies CORE 0 to forcibly shut down the system processes, and notifies the power management chip to shut down.

In a step of S509, the power management chip switches off the power input of CPU and peripheral circuits such as RAM and ROM.

The power management chip cuts off the power input of CPU and peripheral circuits such as RAM and ROM, and only keeps the power input of the physical core CORE X of CPU, and at the same time regulates the voltage of the physical core CORE X to 1.8 v, to keep the physical core operating normally at low voltage.

Figure 6:
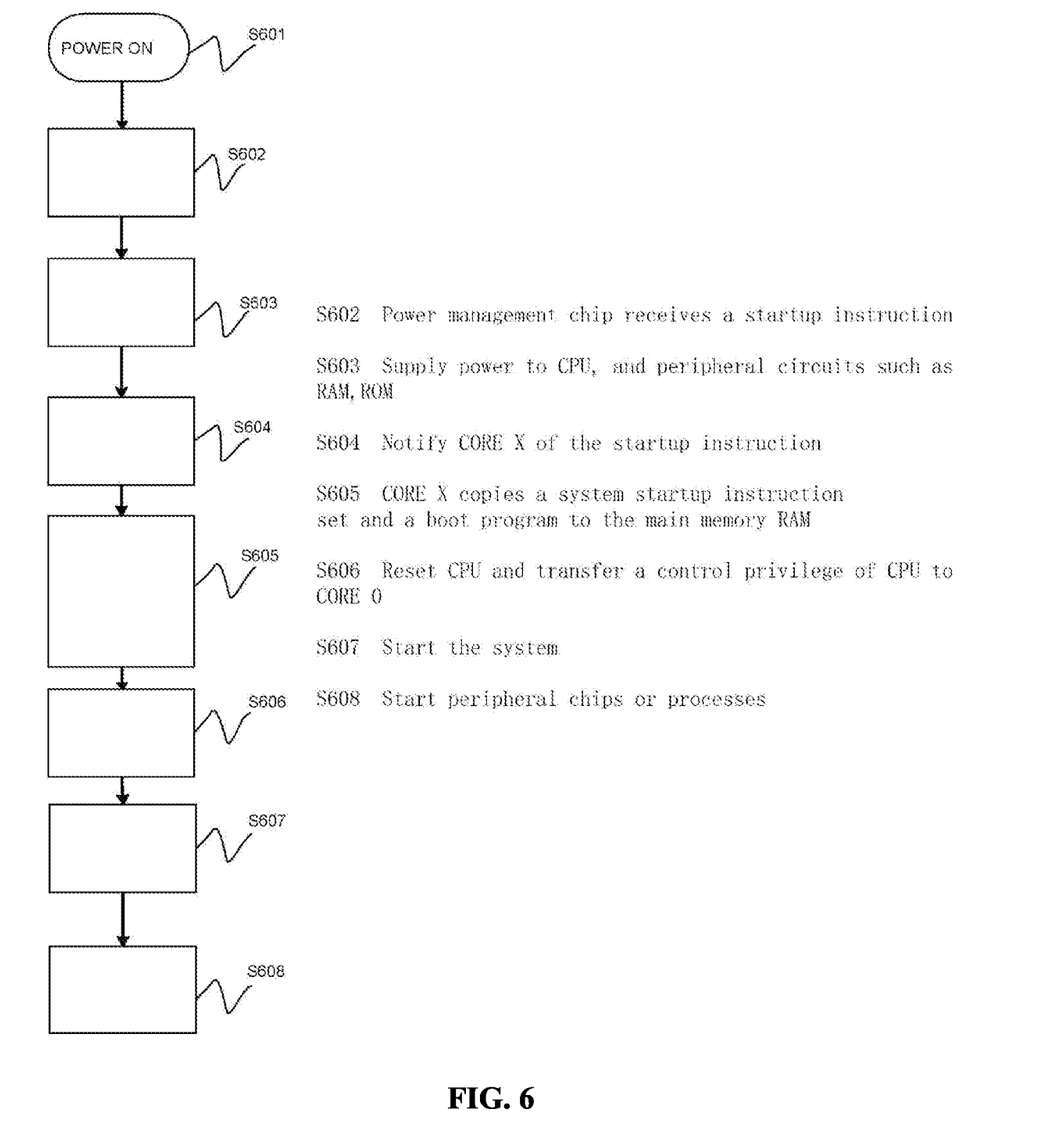
FIG. 6 is a flowchart of a startup method according to an alternative embodiment of the present disclosure.

Based on the multi-core chip architecture in the previous embodiments, a quick startup method is provided, as shown in FIG. 6, including the following steps S601 to S608.

In a step of S601, power on is performed.

A user presses a power-on key.

In a step of S602, the power management chip receives a startup instruction.

The power management chip detects that the user has started the device.

In a step of S603, power is supplied to CPU, and peripheral circuits such as RAM, ROM.

The power management chip supplies power to CPU, and peripheral circuits such as RAM, ROM to ensure the normal power input of the physical hardware of the system.

In a step of S604, the power management chip notifies the physical core CORE X of the startup instruction.

The power management chip notifies the physical core CORE X of the CPU of the startup instruction.

In a step of S605, the CORE X copies a system startup instruction set and a boot program to the main memory RAM.

The physical core CORE X copies the system startup instruction set and the boot program to the main memory RAM. Since RAM0 has stored the boot program and system address in a system startup instruction area, copying startup information to the main CPU by the CORE X can greatly save the time required for copying the system from external memory to internal memory, and reduce the number of dynamic loader programs. Only programs related to user experience, such as UI, indicator lights, are started first.

In a step of S606, the CORE X resets other cores of CPU and transfers a control privilege to CORE 0.

The physical core CORE X is responsible for resetting other physical cores of CPU, and transferring the system control privilege to CORE 0 to complete the boot process.

In a step of S607, the system is started.

At this time, the startup of the system is completed, which for an intelligent device corresponds to that the UI is ready.

In a step of S608, peripheral chips or processes are started.

Then, the system starts to self-start other low-priority processes or chips. For example, the communication chip, bluetooth chip or WIFI chip in the smart phone starts quickly and has weak influence on the user experience, so these peripheral chips may be started after the system starts to speed up the startup process.

Figure 7:
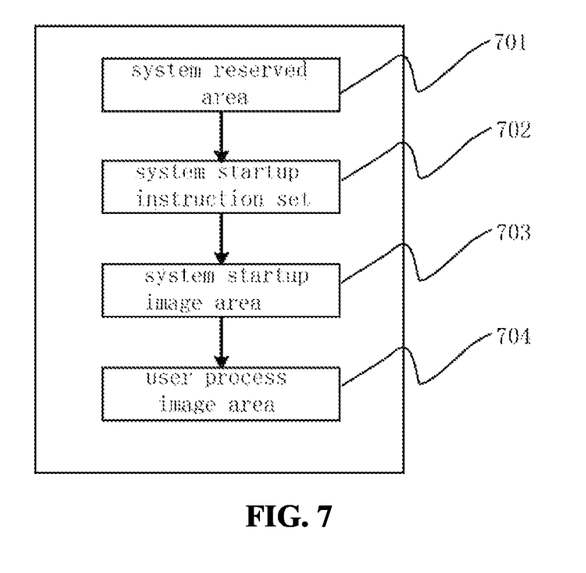
FIG. 7 is a schematic structural diagram of a memory according to an alternative embodiment of the present disclosure.

Based on the built-in small-capacity memory in the multi-core chip architecture in the previous embodiments, a memory mapping structure is further provided. As shown in FIG. 7, the built-in small-capacity memory includes a system reserved area 701, a system startup static area 702, a system startup image area 703 and a user process image area 704.

The memory mapping structure will be described in detail with reference to the drawings.

The system reserved area 701 refers to a system area reserved for CORE X to back up its own system data.

The system startup static area 702 is configured to save the system boot program and instruction set in ROM.

The system startup image area 703 refers to an address area that saves the key process addresses and program data of the system before shutdown which may be directly copied to the main memory for quick startup.

The user process image area 704 is configured to save the address and program data of the user process before shutdown, to realize the rapid loading of the process after quick startup, and in some embodiments, to realize on-site recovery before shutdown.

Figure 8:
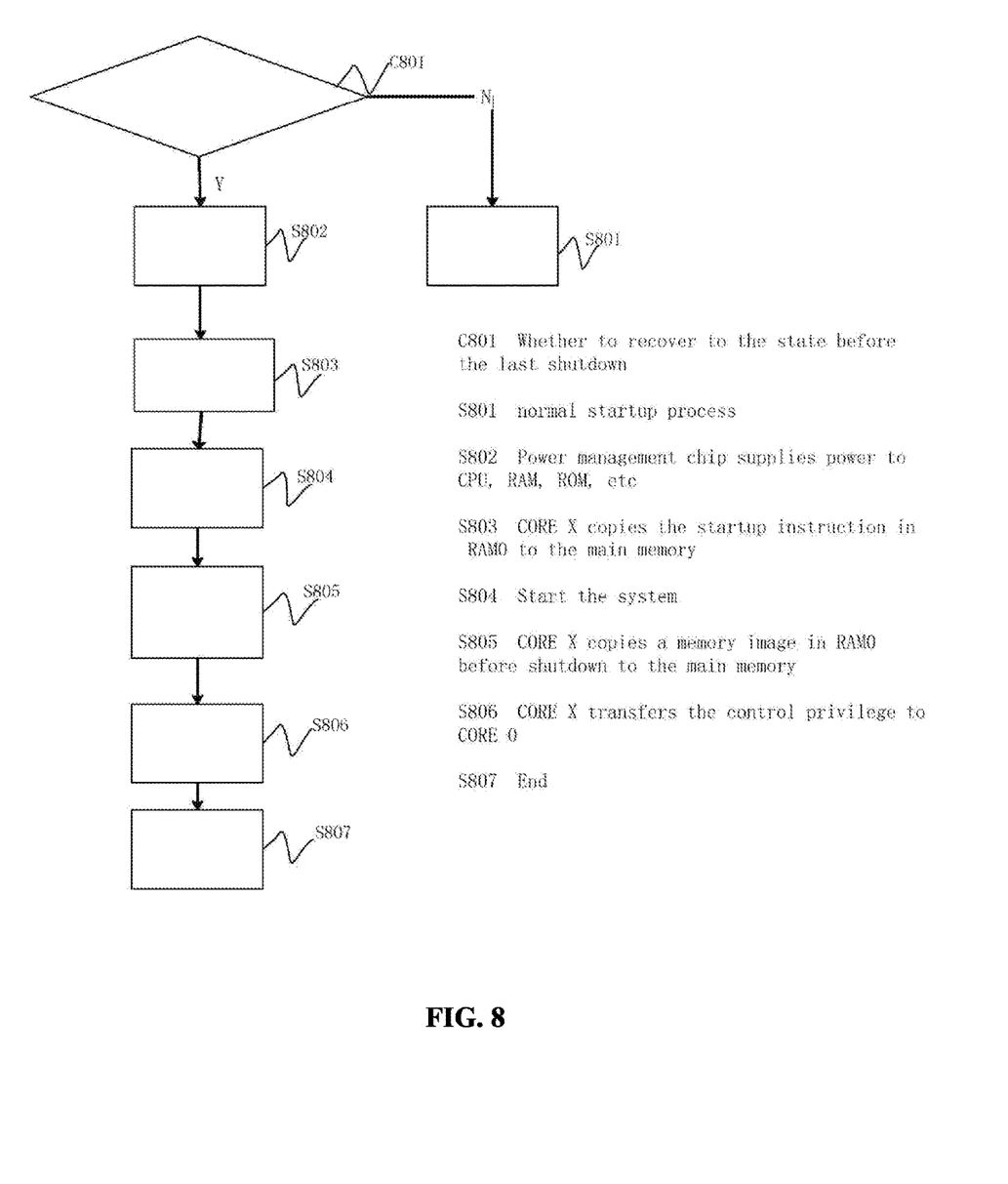
FIG. 8 is a flowchart of a method for system on-site recovery according to an embodiment of the present disclosure.

Based on the multi-core chip architecture in the previous embodiments, a method for fast on-site recovery is further provided, as shown in FIG. 8, including the following steps S801 to S807.

In a step of judgment C801, whether to recover to the state before the last shutdown is judged.

In a step of S801, a normal startup process is performed.

In a step of S802, the power management chip supplies power to CPU, and other peripheral devices such as RAM, ROM.

In a step of S803, the physical core CORE X copies the startup instruction in RAM0 to the main memory.

In a step of S804, the system is started.

In a step of S805, the physical core CORE X copies a memory image in RAM0 before shutdown to the main memory.

In a step of S806, the physical core CORE X transfers the control privilege to CORE 0.

In a step of S807, the process ends.

Figure 9:
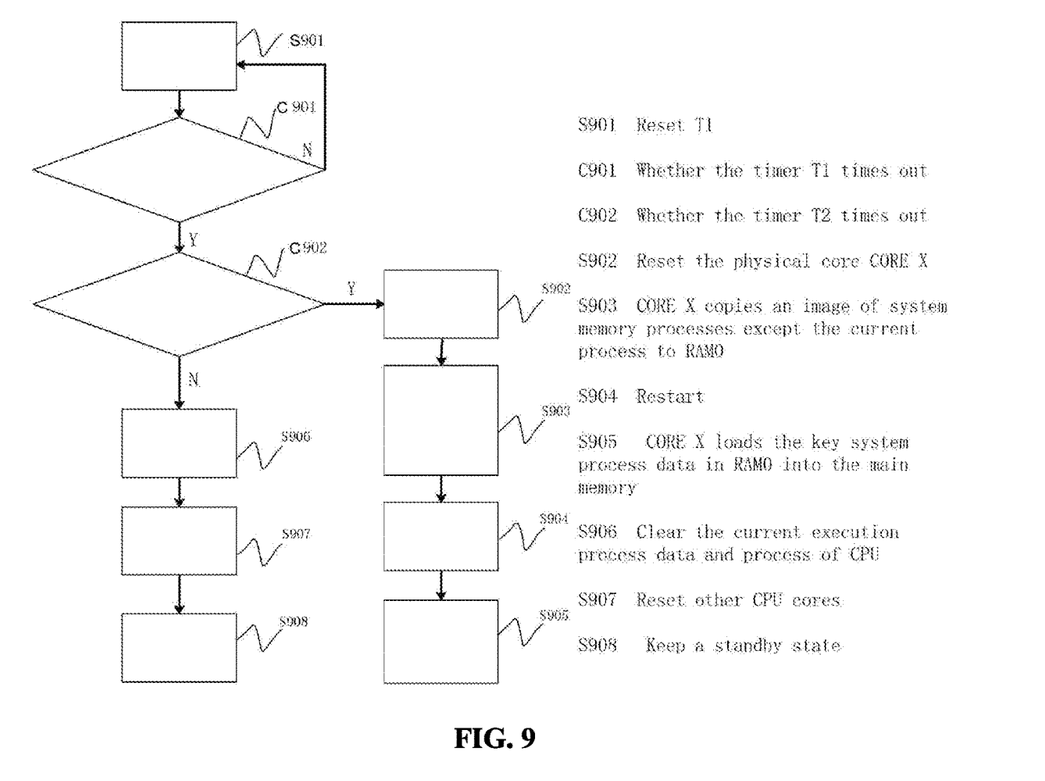
FIG. 9 is a flowchart of a method for recovery from system crash according to an embodiment of the present disclosure.

Based on the multi-core chip architecture in the previous embodiments, a method for recovery from system crash is further provided. In this embodiment, the system adopts a watchdog strategy. The watchdog uses a timer circuit, and has a timing output connected to a reset terminal of the circuit. The program clears the timer within a certain time range (commonly known as "feeding the dog"). Therefore, when the program operates normally, the timer can never overflow, and the reset signal cannot be generated. If the program fails, and the watchdog is not reset within the timing period, the watchdog timer will overflow to generate a reset signal and restart the system. In the present disclosure, a dual-watchdog strategy based on physical core CORE X is proposed, in which the main CPU uses timer T1, and the physical core CORE X uses timer T2, which is larger than T1 and has a value of 1.5*T1. When T1 times out and T2 does not time out, the current process data are cleared, and the physical core CORE X is responsible for copying the process address data in the current main memory. In order to improve the system efficiency, in this embodiment, only the key system process data, such as network process and UI process, are copied and then the CPU is reset, and process address data are reloaded and saved. Only when both timers T1 and T2 time out, the system will be restarted to enter the quick restart process.

As shown in FIG. 9, the method for recovery from system crash of this embodiment includes the following steps S901 to S908.

In a step of S901, T1 is reset.

When timer T1 does not time out, T1 is reset.

In a step of judgment C901, whether the timer T1 times out is judged.

Whether watchdog T1 of the main CPU times out is detected, and if the timer T1 times out, judgment C902 is executed; if the timer T1 does not time out, step S901 is executed.

In a step of judgment C902, whether the timer T2 times out is judged.

Whether watchdog T2 of the physical core CORE X times out is detected, and if the timer T2 times out, step 5902 is executed; if the timer T2 does not time out, step S906 is executed.

In a step of S902, the physical core CORE X is reset.

T2 timeout means that the physical core CORE X may have lost response, so the physical core is reset at this time.

In a step of S903, the physical core CORE X copies an image of system memory processes except the current process to RAM0.

The physical core CORE X copies other memory process images in the current system except the current process to RAM0, and backs up the user process address and data.

In a step of S904, the system is restarted.

The system is restarted. The power management chip cuts off the power input of CPU, RAM and ROM, etc., and then restarts.

In a step of S905, the physical core CORE X loads the key system process data in RAM0 into the main memory.

The physical core CORE X copies the shutdown data in RAM0 to the main memory to recover the state before the system crash to a maximum extent.

In a step of S906, the current execution process data and process of CPU are cleared.

The physical core CORE X clears all register cache data from CORE 0 to CORE N.

In a step of S907, other CPU cores are reset.

The physical core CORE X resets the main CPU circuit.

In a step of S908, a standby state is kept, that is, the system keeps the standby normal operation state.

Figure 10:
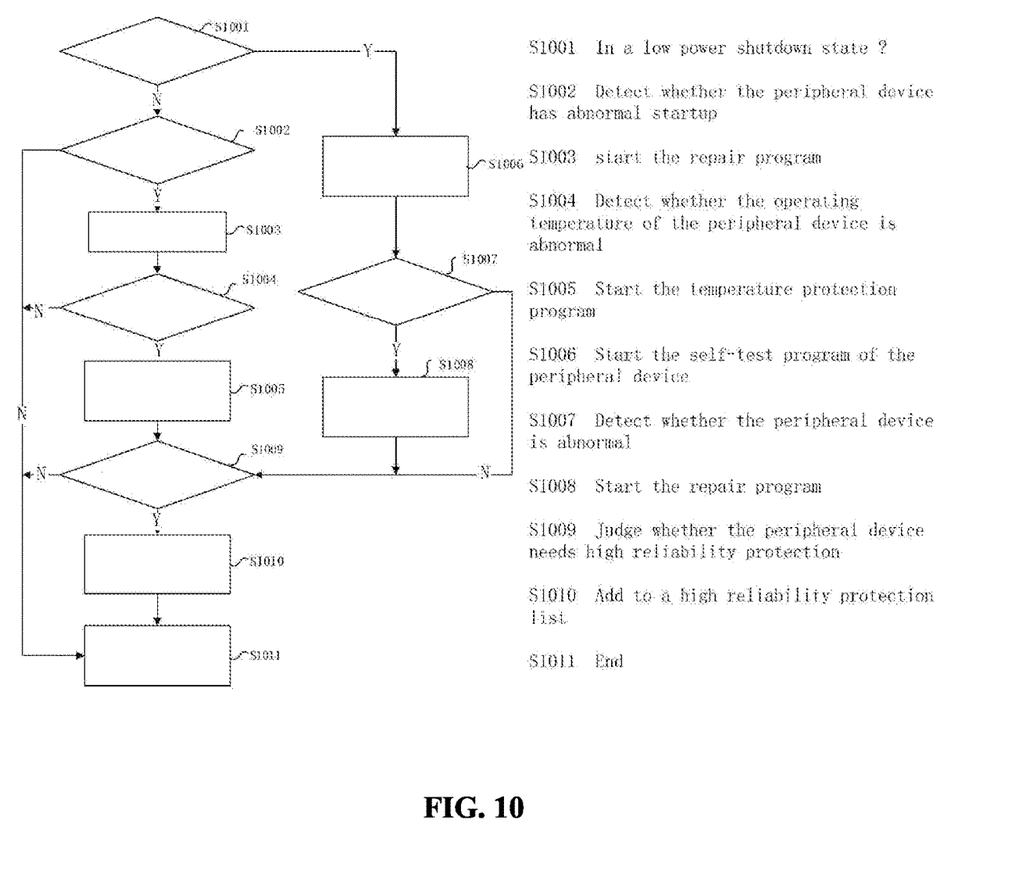
FIG. 10 is a flowchart of a method for peripheral device reliability management according to an embodiment of the present disclosure.

Based on the multi-core chip architecture in the previous embodiments, a method for peripheral device reliability management is further provided. In this embodiment, a built-in reliability module can dynamically check the running state of peripheral devices in normal operating mode and low power shutdown mode, or check whether the devices are abnormal and try to repair the devices.

In this embodiment, the reliability module may have a built-in peripheral device repair program, a peripheral device temperature protection program and a low-power peripheral device self-test program. Through general reliability programs, including the device repair program, the peripheral device temperature protection program and the low-power peripheral device self-test program, the module can implement a peripheral device reliability check algorithm and control the peripheral devices under low power consumption.

The peripheral devices in this embodiment may include but are not limited to, memory, FLASH, indicator light, screen, Bluetooth, WIFI, communication module, etc.

As shown in FIG. 10, the method for peripheral device reliability management includes the following steps S1001 to S1011.

In a step of judgment S1001, whether the multi-core chip is in a low power shutdown state is judged.

Whether the multi-core chip is in a normal operating state or has been shut down to enter a low power state is judged, and if the multi-core chip is in a normal operating state, judgment S1002 is executed; if the multi-core chip is in an abnormal operating state, i.e., the low power shutdown state, judgment S1004 is executed.

In a step of judgment S1002, whether there is a peripheral device with abnormal startup is detected.

Whether there is a peripheral device with abnormal startup is detected, and if there is abnormal startup, step S1003 is executed to try to repair; if there is no abnormal startup, judgment S1004 is executed.

In a step of S1003, the repair program is started.

The repair program is executed, to try to restart the peripheral device, or reload the peripheral device.

In a step of S1004, whether the operating temperature of the peripheral device is abnormal is detected.

Whether the operating temperature of the peripheral device is normal is detected, and if the operating temperature is abnormal, step S1005 is executed; if the operating temperature is normal, step S1009 is executed.

In a step of S1005, the temperature protection program is started.

The temperature protection program is executed, and the built-in temperature protection program is executed, for example, by controlling the speed and operating frequency, etc.

In a step of S1006, the self-test program of the peripheral device is started.

The self-test program of the peripheral device is started to detect exceptions in the working log of the peripheral device.

In a step of S1007, whether the peripheral device is abnormal is detected.

Whether the peripheral device is abnormal is detected, and if so, step S1008 is executed; if not, step S1009 is executed.

In a step of S1008, the repair program is started.

The repair program is started, to try to repair the exceptions in the operation of peripheral device. A corresponding repair method is used based on the exception classification in the exception log.

In a step of judgment S1009, whether the peripheral device needs high reliability protection is judged.

Whether the peripheral device needs high reliability protection is judged, and if so, S1010 is executed; if not, S1011 is executed.

In a step of S1010, the peripheral device that needs high reliability protection is added to a high reliability protection list.

High reliability protection is performed for the peripheral device or application.

In a step of S1011, the process ends.

According to the present disclosure, a storage medium storing a computer program is further provided, where the computer program, when executed, performs the steps in any of the above method embodiments.

In the above embodiments of the present disclosure, a low-power physical core and a power management chip are introduced into the multi-core chip, and the multi-core chip is subjected to hierarchical voltage power control through the power management chip, so that the low-power physical core can still operate normally under the condition that the whole terminal is shut down and powered off. The physical core saves the necessary startup instruction set through a built-in small-capacity memory, so when receiving the startup instruction, the physical core copies the startup instruction set to the main memory through memory mapping, thereby greatly shortening the startup time.

It will be apparent to those having ordinary skill in the art that the modules or steps of the present disclosure described above may be implemented by a general-purpose computing device, which may be centralized on a single computing device, or distributed over a network of multiple computing devices, or may be implemented by program code executable by the computing device, so that they may be stored in a storage device and executed by the computing device, and in some cases may be implemented by performing the steps shown or described in a sequence different from that herein, or may be separately fabricated into individual integrated circuit modules, or some of them may be fabricated into an individual integrated circuit module. Therefore, the disclosure is not limited to any particular combination of hardware and software.

The foregoing only describes embodiments of the present disclosure and is not intended to limit the present disclosure. Various modifications and variations may be made to the present disclosure by those having ordinary skill in the art. Any modifications, equivalent substitutions, improvements, etc. made within the principles of the disclosure shall be included within the scope of protection of the disclosure.

What is claimed is:

1. A multi-core chip, comprising:
   a main CPU;
   a main memory;
   a first physical core, wherein,
   in response to receiving a system shutdown instruction, the first physical core is configured to extract a minimum resource set which is configured for starting up a system, save the minimum resource set in a first built-in memory, and notify the main CPU to shut down the system;
   in response to receiving a system startup instruction, the first physical core is further configured to copy the minimum resource set in the first built-in memory to the main memory, and transfer a system control privilege to the main CPU; and
   the first physical core is operable at a first voltage which is a normal operating voltage of the first physical core and a second voltage which is a holding voltage of the first physical core in a system shutdown state, and the first voltage is greater than the second voltage;
   the first built-in memory, configured to save the minimum resource set; and
   a power management chip, configured to convert voltages to realize output of multi-level voltages, to provide an operating voltage for the system in a system startup state and to provide the second voltage for the first physical core in the system shutdown state;
   wherein the first physical core is further configured to extract a current user process address and path, and copy the current user process address and path to the first built-in memory.

2. The multi-core chip of claim 1, wherein the first physical core is further configured to copy a running process data of the main CPU to the first built-in memory during shutting down the system, and recover the system to a running state before the system is shut down according to the running process data of the main CPU saved in the first built-in memory in a next startup of the system.

3. The multi-core chip of claim 1, wherein the multi-core chip further comprises a plurality of physical cores, multi-threads and multi-level caches corresponding to the plurality of physical cores, a memory management unit (MMU) for mapping and addressing each physical memory in the system, and a peripheral circuit, wherein the peripheral circuit comprises at least one of a system bus, a main memory and an external memory.

4. The multi-core chip of claim 1, further comprising:
a first physical core input circuit, configured to input the first voltage provided by the power management chip to the first physical core in the system startup state, and input the second voltage provided by the power management chip to the first physical core in the system shutdown state;
a main CPU input circuit, configured to input a main CPU operating voltage provided by the power management chip to the main CPU;
a system bus input circuit, configured to input a system bus operating voltage provided by the power management chip to a system bus;
a main memory input circuit, configured to input a main memory operating voltage provided by the power management chip into the main memory.

5. The multi-core chip of claim 1, wherein the first built-in memory comprises:
a system reserved area for the first physical core, configured for the first physical core to back up system data;
a system startup static area, configured to save a system startup startup program and a system startup instruction set;
a system startup image area, configured to save system process address and program data before shutdown; and
a user process image area, configured to save user process address and program data before shutdown.

6. The multi-core chip of claim 1, further comprising:
a watchdog circuit comprising a first timer configured to reset the main CPU and a second timer configured to reset the first physical core, and the second timer has a value larger than that of the second timer.

7. An electronic system, comprising a peripheral device and the multi-core chip of claim 6.

8. A method for recovery from system crash based on the system of claim 7, comprising:
detecting whether the first timer and the second timer time out;
resetting the main CPU and other physical cores except the first physical core in response to that the first timer times out while the second timer does not time out; and
resetting the first physical core in response to that the second timer times out.

9. The method for recovery from system crash of claim 8, wherein after resetting the first physical core, the method further comprises:
copying, by the first physical core, an image of system memory processes except a current process to the first built-in memory;
restarting the system, and loading, by the first physical core, the image of the system memory process saved in the first built-in memory into the main memory; and
resetting, by the first physical core, the main CPU and other physical cores except the first physical core.

10. The multi-core chip of claim 1, further comprising a reliability function module for repairing and detecting a peripheral device, wherein the reliability function module comprises at least one of a repair unit for program repair of the peripheral device, a protection unit for temperature protection of the peripheral device, and a self-test unit for self-test of the peripheral device.

11. An electronic system, comprising a peripheral device and the multi-core chip of claim 10.

12. A method for peripheral device management based on the system of claim 11, comprising:
judging whether the system is in a normal operating state or a low power shutdown state;
in response to the system being in the normal operating state, detecting whether there is an abnormal startup and/or an abnormal temperature in the peripheral device; in response to detection of the abnormal startup and/or the abnormal temperature in the peripheral device, starting a repair program and/or starting a temperature protection program, by the reliability function module, to perform repair and/or temperature protection for the peripheral device.

13. The method for peripheral device management of claim 12, wherein:
in response to the system being in the low power shutdown state, starting a self-test program of the peripheral device to detect whether the peripheral device is abnormal; and
in response to the peripheral device being abnormal, starting a repair program to repair the peripheral device.

14. An electronic system, comprising a peripheral device and the multi-core chip of claim 1.

15. A method for power management based on the system of claim 14, comprising:
providing, by the power management chip, a normal operating voltage for each component of the system and regulating a voltage of the first physical core from the second voltage to the first voltage in response to receiving a system startup instruction; and
cutting off, by the power management chip, the voltage of each component of the system, continuing to supply power to the first physical core, and regulating the voltage of the first physical core from the first voltage to the second voltage in response to receiving a system shutdown instruction.

16. A shutdown method based on the system of claim 14, comprising:
receiving, by the first physical core, a system shutdown instruction;
extracting, by the first physical core, a minimum resource set and a current user process address and path, and copying the minimum resource set and the current user process address and path to the first built-in memory; and
notifying, by the first physical core, the main CPU to force a process shutdown, and notifying the power management chip to cut off a power supply of the system.

17. The shutdown method of claim 16, wherein after notifying, by the first physical core, the power management chip to cut off the power supply of the system, the method further comprises:
cutting off, by the power management chip, the voltage of each component of the system, continuing to supply power to the first physical core, and regulating the voltage of the first physical core from the first voltage to the second voltage.

18. A startup method based on the system of claim 14, comprising:
- receiving, by the first physical core, a system startup instruction;
- copying, by the first physical core, the minimum resource set saved in the first built-in memory to the main memory; and
- transferring, by the first physical core, the system control privilege to the main CPU.

19. The startup method of claim 18, wherein before receiving, by the first physical core, the system startup instruction, the method further comprises:
- providing, by the power management chip, a normal operating voltage for each component of the system after receiving the system startup instruction, and regulating a voltage of the first physical core from the second voltage to the first voltage; and
- notifying, by the power management chip, the first physical core of the system startup instruction.

20. A system recovery method based on the system of claim 14, comprising:
- receiving, by the first physical core, an instruction to recover to a state before last shutdown;
- copying, by the first physical core, the startup instruction saved in the first built-in memory to the main memory to start the system; and
- copying, by the first physical core, a memory image before shutdown saved in the first built-in memory to the main memory, and transferring the system control privilege to the main CPU.

* * * * *